US005106528A

United States Patent [19]

Francis et al.

[11] Patent Number: 5,106,528

[45] Date of Patent: Apr. 21, 1992

[54] BLEACH ACTIVATION AND BLEACHING COMPOSITIONS

[75] Inventors: Keith C. Francis, Oxton, Great Britain; Stephen A. Madison, Rockland, N.Y.; John Oakes, Winsford; David W. Thornthwaite, Neston, both of Great Britain

[73] Assignee: Lever Brothers Company, Division of Conopco, Inc., New York, N.Y.

[21] Appl. No.: 521,810

[22] Filed: May 10, 1990

[30] Foreign Application Priority Data

May 10, 1989 [GB] United Kingdom ................ 8910725

[51] Int. Cl.[5] .......................... C01B 15/10; C09K 3/00

[52] U.S. Cl. .......................... 252/186.23; 252/186.21; 252/186.38; 252/186.39

[58] Field of Search ...................... 252/186.23, 186.22, 252/186.38, 186.39

[56] References Cited

U.S. PATENT DOCUMENTS

| | | | |
|---|---|---|---|
| 4,412,934 | 11/1983 | Chung et al. | 252/186.38 |
| 4,536,314 | 8/1985 | Hardy et al. | 252/186.38 |
| 4,681,592 | 7/1987 | Hardy et al. | 252/186.38 |
| 4,818,426 | 4/1989 | Humphreys et al. | 252/186.58 |
| 4,933,103 | 6/1990 | Aoyagi et al. | 252/186.38 |

FOREIGN PATENT DOCUMENTS

| | | |
|---|---|---|
| 0068547 | 1/1983 | European Pat. Off. . |
| 0106584 | 3/1984 | European Pat. Off. . |
| 0105690 | 4/1984 | European Pat. Off. . |
| 0257700 | 3/1988 | European Pat. Off. . |
| 0284292 | 9/1988 | European Pat. Off. . |
| 0325289 | 7/1989 | European Pat. Off. . |

*Primary Examiner*—Richard D. Lovering
*Assistant Examiner*—Joseph D. Anthony
*Attorney, Agent, or Firm*—Milton L. Honig

[57] ABSTRACT

Bleaching and detergent compositions are disclosed which upon dissolution in aqueous medium provide a mixture of hydrophobic and cationic peroxyacids. The compositions which are highly effective at removing a wide range of stain types with better background whiteness at bleach solution temperatures of 40° C. and less, comprise a peroxide bleach compound, a hydrophobic peroxyacid (bleach precursor) and a cationic or amphoteric peroxyacid (bleach precursor).

5 Claims, 2 Drawing Sheets

BLEACH ACTIVATION AND BLEACHING COMPOSITIONS

FIELD OF THE INVENTION

This invention relates to improved bleach activation and bleaching compositions. More particularly, this invention relates to novel bleaching and/or detergent compositions that provide an effective and efficient overall bleaching performance on textiles and fabrics over a wide class of stains at low to medium temperatures, e.g. from 20° C. to 50° C.

BACKGROUND AND PRIOR ART

Detergent bleach compositions for washing at higher temperatures are well known in the art. As bleaching agent they normally contain a peroxide compound which liberates hydrogen peroxide in aqueous solution, such as the peroxyhydrates, including alkali metal perborates, percarbonates, perphosphates and persilicates, urea peroxide and the like. These bleaching agents are only effective at higher temperatures of the bleaching solution, i.e. from 80° C. up to the boil.

It is known that the bleach activity of peroxide bleach compounds can be improved so as to become effective at lower wash temperatures, e.g. 40°-60° C., by the use of peroxyacid bleach precursors, often also referred to as bleach activators.

Numerous substances have been disclosed in the art as effective bleach activators.

GB Patents 836,988 and 864,798 (UNILEVER) are examples of the earlier patents in the field revealing this technology. They disclose several classes of esters, including the benzoyl ester of sodium phenol sulphonate (SBOBS) and sodium-p-acetoxybenzene sulphonate (SABS).

Another early patent in this field is GB Patent 855,735, which discloses the broad class of "acyl organoamides", to which the currently most widely used N,N,N'N'-tetraacetyl ethylene diamine (TAED) belongs.

A series of articles by Allan H. Gilbert in Detergent Age, June 1967, pages 18-20; July 1967, pages 30-33 and August 1967, pages 26, 27 and 67, disclose a further collection of various bleach activator compounds.

More recent patents disclosing bleach activators are, for example, EP-A-0 120 591; EP-A-0 174 132; EP-A-0 185 522 and U.S. Pat. Nos. 4,412,934; 4,248,928; 4,126,573 and 4,100,095.

Typically, the substances that have been proposed and utilized as bleach activators are organic compounds which react with the perhydroxide anion ($OOH^{31}$) of the hydrogen peroxide yielded by the peroxide bleach in the bleaching solution, to form a peroxyacid which is more reactive than the peroxide bleach alone to effect bleaching at bleach solution temperatures of below 60° C. Being a reactive chemistry mechanism, it is easily understood that the effectiveness of bleach activators is determined by factors such as solubility, reactivity, pKa, and type of peroxyacid generated, and that not all bleach activators perform equally well upon each individual stain. For example, a particular type of stain which is effectively removed by one specific peroxyacid precursor-hydrogen peroxide combination, may not be as effectively removable by another peroxyacid precursor/$H_2O_2$ system. Since many classes of soiling are encountered in household and industrial practice, there is not one single bleach activator which is effective on all sorts of bleachable soiling and stains. Domestic soils contain hydrophilic and hydrophobic components.

Various attempts have been made to improve the overall bleaching performance on fabrics over a wide range of stains and soilings by bleach system combinations, but such attempts have in general met with only limited success and/or specific drawbacks.

A continuing trend towards even lower wash temperatures has furthermore presented a constant need for peroxide bleaches with real efficacy at temperatures of 40° C. and there below.

EP-A-0 105 690 discloses bleaching compositions consisting of a peroxycarboxylic acid and an aromatic sulphonyl halide bleach activator, which are believed to react and form acyl persulphonates as the bleaching species.

EP-A-0 106 584 (equivalent to U.S. Pat. No. 4,671,891 to HARTMAN) discloses bleaching compositions comprising a mixture of a halogenated peroxybenzoic acid and a carbonyl carbon atom containing bleach activator which together form diacylperoxides, or a mixture of a peroxycarboxylic acid such as diperoxydodecanedioic acid and a long chain acyl-containing bleach activator which together form diacylperoxides.

EP-A-0 257 700 (UNILEVER) discloses the use of a bleach system comprising a percompound and a mixture of TAED and sodium nonanoyloxy benzene sulphonate.

EP-A-0 068 547 (PROCTER & GAMBLE) discloses laundry bleach compositions comprising a mixture of hydrophilic and hydrophobic peroxyacid bleaches, a typical example being a mixture of perlauric acid and diperoxy dodecane dioic acid.

Still, the performances of these prior art systems are far from ideal. Furthermore, diacylperoxides are at least suspicious and sulphonyl halides tend to be relatively unstable.

DESCRIPTION OF THE INVENTION

The present invention seeks to provide an improved bleaching composition that is highly effective in removing a wide range of stain types with better background whiteness at bleach solution temperatures of 40° C. and less.

It has now been found that bleaching compositions comprising a peroxide bleach compound and a bleach activator system comprising a mixture of i) a hydrophobic peroxyacid bleach precursor, and ii) a cationic or amphoteric peroxyacid bleach precursor, are highly effective at removing a wide range of stain types with better background whiteness at bleach solution temperatures of 40° C. and less.

Accordingly, in one aspect the invention provides a bleach activator system for use with a peroxide bleach compound comprising a mixture of:

i) a hydrophobic peroxyacid bleach precursor and ii) a cationic or amphoteric peroxyacid bleach precursor.

In another aspect the invention provides a bleaching composition comprising a peroxide bleach compound, a bleach activator system comprising a mixture of a hydrophobic peroxyacid bleach precursor and a cationic or amphoteric peroxyacid bleach precursor.

The bleaching compositions of the invention are thus those which, upon dissolution in aqueous medium, provide a mixture of hydrophobic and cationic peroxyacids.

Though each of these peroxyacids is preferably formed in situ upon dissolution, it may also be incorporated as such in the bleaching composition.

The invention therefore encompasses bleaching compositions comprising any of the following mixtures:

(a) a hydrophobic peroxyacid bleach precursor and a cationic or amphoteric peroxyacid bleach precursor;

(b) a hydrophobic peroxyacid bleach precursors and a cationic peroxyacid;

(c) a hydrophobic peroxyacid and a cationic or amphoteric peroxyacid bleach precursor; and (d) a hydrophobic peroxyacid and a cationic peroxyacid.

In a highly preferred embodiment, the bleaching compositions within the invention are detergent compositions.

Just like the peroxyacids, bleach activators can be classified as having 1) hydrophilic activity or 2) hydrophobic activity or 3) intermediate activity.

Bleach activators having hydrophilic activity (hydrophilic peroxyacid precursors) are effective on hydrophilic bleachable soils, such as tea, fruit juices, wine and the like.

Bleach activators having hydrophobic activity (hydrophobic peroxyacid precursors) are effective on hydrophobic bleachable soils, such as sebum and body soils in general, which are fatty acid/triglyceride-based, stains from ketchup and sauces, including lycopene and carotenes, which are the orange pigment in e.g. tomato and spaghetti sauces.

Intermediate bleach activators have both hydrophilic activity and hydrophobic activity, but to a lesser extent than the bleach activators of category 1) or 2).

The Hydrophobic Peroxyacid Precursor

The hydrophobic peroxyacid bleach precursor used in the invention is defined as a reactive organic compound containing a carbonyl group that in alkaline solution containing a source of hydrogen peroxide, e.g. a peroxide compound, such as sodium perborate, will generate a peroxyacid, the parent acid of which has a log P value of between 1.6 and 4.5, wherein P is the octanol/water partition coefficient.

Hydrophobicity decreases with decreasing parent acid-log P value. Peroxyacid bleach precursors with parent acid-log P below 1.6 are unsuitable as they become too hydrophilic. The upper log P value is only limited by the solubility of the precursor-peracid, and peroxyacid bleach precursors with log P above 4.5 would be less suitable to be of practical use.

Usable hydrophobic peroxyacid bleach precursors as defined herein include compounds having the general formula:

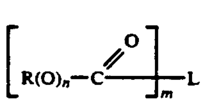

(I)

wherein R is a straight or branched chain, optionally substituted alkyl or alkylene group containing from 6 to 20 carbon atoms, a substituted or unsubstituted, aromatic, cyclic alkyl or heterocyclic group containing a total of from 10 to 22 carbon atoms; n is an integer from 0-1; m is an integer from 1-5; and L can be any suitable leaving group which exerts an electron-attracting effect, wherein the conjugate acid of the anion formed on L has a pKa in the range of from about 4 to about 13, which upon perhydrolysis will generate a peroxyacid of formula

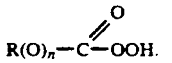

Preferred hydrophobic peroxyacid precursors are those of the above formula (I) wherein R is as defined above and L is selected from:

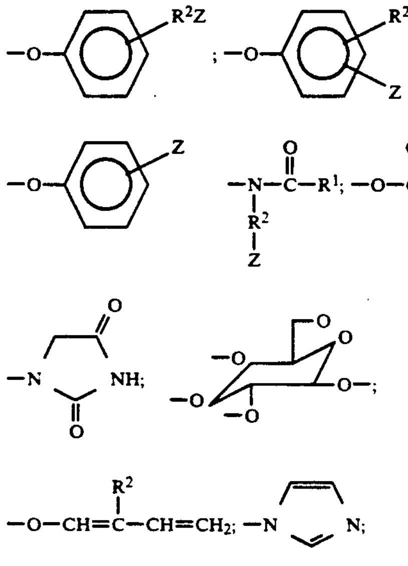

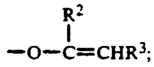

and

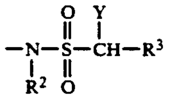

wherein $R^1$ is an alkyl group containing from 5 to about 17 carbon atoms; $R^2$ is an alkyl chain containing from 1 to 8 carbon atoms; $R^3$ is H or $R^2$; and Z is H or a solubilizing group. When Z is a solubilizing group, this may be selected from $—SO_3^-M^+$; $—CO_2^-M^+$; $—SO_4^-M^+$; $—N^+(R^3)_3X^-$; $—NO_2$; —OH, and $O \leftarrow N(R^2)_2$ and mixtures thereof, wherein $M^+$ is a cation which provides solubility to the precursor and $X^-$ is an anion which provides solubility to the precursor. Preferred solubilizing groups are $—SO_3^-M^+$ and $—CO_2^-M^+$, wherein M is preferably sodium or potassium.

Especially preferred hydrophobic peroxyacid precursors are those of formula (I) wherein R is a straight or branched chain alkyl group containing 8 to 18 carbon atoms and L contains an aromatic ring, preferably with n=0 and m=1-2. Specific examples of suitable hydrophobic peroxyacid precursors are: sodium or potassium p-linear octanoyloxy benzene sulphonate; sodium or potassium p-linear nonanoyloxy benzene sulphonate (SNOBS); sodium or potassium 3,5,5-trimethyl hexanoyloxy benzene sulphonate (STHOBS); sodium or potassium-4-nonanoyloxy benzoate; sodium or potassium-1-methoxy-2-decanoyloxy benzene-4-sulphonate; and sodium or potassium-1-methyl-2-nonanoyloxy benzene-4-sulphonate. Other examples of hydrophobic peroxyacid precursors are disclosed in EP-A-0 098 021 and EP-A-0 120 591.

The Cationic or Amphoteric Peroxyacid Precursor

The cationic or amphoteric peroxyacid bleach precursors are defined as bleach precursors having at least one cationic group attached to their molecular structure. As such they include compounds having the general formula:

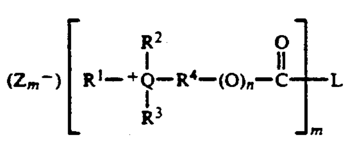
(II)

wherein

- $R_1$, $R_2$ and $R_3$ are each a radical selected from the group consisting of optionally substituted alkyl, alkenyl, alkynyl, cycloalkyl, cycloalkenyl, alkaryl, aryl, phenyl, hydroxyalkyl; polyoxyalkylene and $R_4OCOL$, containing 1 to a total of 24 carbon atoms;
- or two or more of $R_1$, $R_2$ and $R_3$ together with the Q atoms form an optionally substituted Q-containing heterocyclic ring system;
- or two of $R_1$, $R_2$ and $R_3$ together with $R_4$ and the Q atom form an optionally substituted Q-containing heterocyclic ring system;
- Q is nitrogen or phosphorus;
- $R_4$ (if not formed into a heterocyclic ring system together with $R_1$ and/or $R_2$ and/or $R_3$) is a bridging group selected from alkylene, cycloalkylene, alkylene phenylene, phenylene, arylene, and polyalkoxylene containing 1 to 20 carbon atoms, which can be substituted with $C_1$-$C_{20}$ alkyl, alkenyl, benzyl, phenyl and aryl radicals;
- $n=0$ or 1; $m=1$ or 2; $Z^-$ is a monovalent or multivalent anion selected from chloride, bromide, hydroxide, nitrate, methosulphate; bisulphate, acetate, sulphate, citrate, borate and phosphate, which may or may not be present; and
- L is a leaving group, the conjugate acid of which has a PKa in the range of from 4 to 13, preferably from 8 to 10;

which compound upon per-hydrolysis will generate a peroxyacid of the formula:

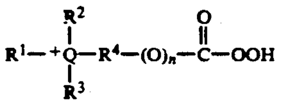

Many and diverse leaving group structures have been described in the patent literature and can be used as L in formula (II).

For example, U.S. Pat. Nos. 4,412,934 and 4,483,778, EP-A-170 386, EP-A-166 571 and EP-A-267 046 provide examples of desirable leaving groups.

Illustrative of leaving group structures L are those selected from the group consisting of:

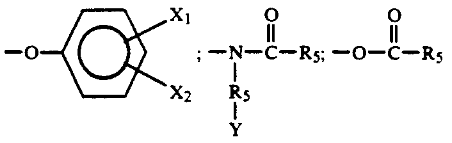

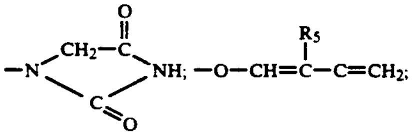

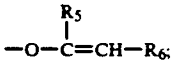 and 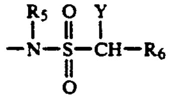

wherein

- $X_1$ and $X_2$ are each individually H or a substituent selected from $-SO_3^-M^+$; $-COO^-M^+$; $-SO_4^-M^+$; $(-N^+R_1R_2R_3)Z^-$; $-NO_2$; and $C_1$-$C_8$ alkyl groups; $R_5$ is a $C_1$-$C_{12}$ alkyl group; $R_6$ is H or $R_5$ and Y is H or $-SO_3^-M^+$, $-COO^-M^+$, $-SO_4^-M^+$, $(N^+R_1R_2R_3)Z^-$ or $-NO_2$;
- M is a hydrogen, alkali metal, ammonium or alkyl or hydroxyalkyl-substituted ammonium cation, which may or may not be present;
- and an $-ONR^7$ group, wherein $NR^7$ is succinimido, phthalimido, pyridinium, 4-phenylpyridinium or $-N=C(CH_3)_2$.

Of these, the most preferred group is

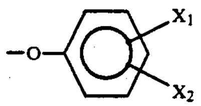

especially the phenol-sulphonate type, e.g. a 4-sulphophenol group, with $M^+$ being sodium, potassium or ammonium cations.

It should be appreciated that the presence of $(Z^-)$ and $(M^+)$ as counter-ions in formula (II) is not essential and that compounds without these counter-ions and being of amphoteric nature are also feasible and within the purview of the present invention.

The terms cationic and amphoteric to denominate the precursor (ii) can be used interchangeably. For example, compounds having a quaternary ammonium group and a leaving group containing an anionic solubilizing group substituent such as:

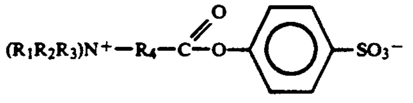

without $(Z^-)$ and $(M^+)$ being present are feasible and can be referred to as amphoteric.

On the other hand, a compound of similar formula without the $SO_3^-$ substituent, i.e.

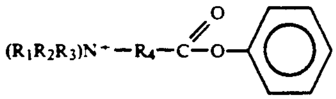

is a true cationic.

Various cationic and amphoteric peroxyacid precursor compounds have been described in literature, e.g. in U.S. Pat. Nos. 4,397,757 and 4,751,015, EP-A-284,292 and EP-A-331 229 (published Sept. 6, 1989). Any of these precursor compounds are suitable for use herein, albeit some compounds are more preferred than others. Another class of cationic peroxyacid precursors usable herein is described in EP-A-303 520; a suitable example is trimethyl ammonium acetonitrile of formula $(CH_3)_3N^+CH_2CN$.

Some specific examples of suitable cationic/amphoteric peroxyacid bleach precursors are:

1)

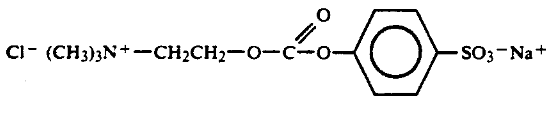

2-(N,N,N-trimethyl ammonium)ethyl sodium 4-sulphophenyl carbonate chloride (SPCC).

2)

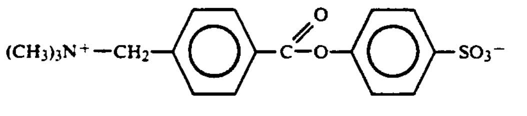

(N,N,N,-trimethyl ammonium)-toluyloxy benzene sulphonate (QTOBS).

3)

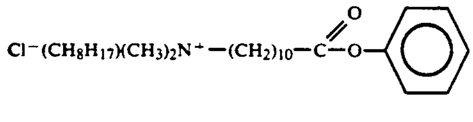

N-octyl-N,N-dimethyl N-10-carbophenoxydecyl ammonium chloride (ODC).

4)

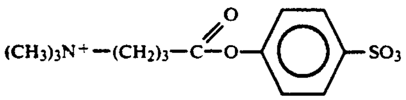

N,N,N,-trimethyl ammonium trimethyl carbonyloxy benzene sulphonate (QTCOBS)

of which compound (1) i.e. SPCC, is especially preferred.

The Composition

The bleach activator system used in the present invention can be composed of any type of each of the above-mentioned precursor compounds in effective molar ratios of hydrophobic peroxyacid precursor (i) to cationic or amphoteric peroxyacid precursor (ii) ranging from about 5:1 to 1:5, preferably from 3:1 to 1:3.

The bleaching compositions within the invention are extremely effective at low temperatures. The compositions provide a superior level of bleaching performance on fabrics and textiles over a wide class of stains, which hitherto had not been achievable with any peroxy bleach systems of the art.

Comparatively speaking, the overall bleaching performance of the bleach system combinations as proposed in the above-cited art is only mediocre.

Bleaching compositions containing only a hydrophobic peroxyacid bleach precursor and a peroxide compound bleach, or containing only a cationic/amphoteric peroxyacid bleach precursor and a peroxide compound bleach do not provide the superior level of bleaching performance over a wide range of stain types.

Bleaching compositions containing only a hydrophobic peroxyacid precursor provide at best a superior level of bleaching performance for only hydrophobic stains, e.g. lycopene. Bleaching compositions containing only a hydrophilic peroxyacid, such as peracetic acid or its precursor, such as TAED, do not provide the superior level of bleaching performance at 40° C. and less, regardless of the type of stains. Bleaching compositions containing only a cationic or amphoteric peroxyacid precursor provide, at best, a superior level of bleaching performance for hydrophilic types of stain, e.g. tea, wine and fruit juices.

Surprisingly, only the compositions of the invention provide the real superior level of bleaching performance on textiles and fabrics at 40° C. and less over a wide range of stain types, which effect under the right conditions is not just additive of the two bleach precursors but clearly of a synergistic nature.

It is surprising that synergy is observed rather than antagonistic interaction as anticipated when a cationic precursor is mixed with an anionic hydrophobic precursor, such as SNOBS. Antagonism is expected for two reasons:

(i) Based on the theory that self-decomposition of peroxyacid depends upon two peracid molecules diffusing together, interaction of positive charge on a quaternary ammonium peroxyacid with negative charge of the hydrophobic peroxyacid could lead to increased self-decomposition of peroxyacid, hence reduced bleaching.

(ii) Interaction of positive charge on quaternary ammonium peroxyacid with negatively charged hydrophobic peroxyacid could also lead to precipitation, hence reduced substantivity.

Without wishing to be bound to any theory, it is believed that the compositions of the invention function by the formation and presence of two co-acting peroxyacid types in solution, i.e.

1) a hydrophobic peroxyacid of formula $R(O)_nCO_3H$ and 2) a cationic peroxyacid of formula $R^1R^2R^3Q^+-R^4-(O)_n-CO_3H$ Thus, it is within the context of the present invention to provide a bleaching and cleaning solution comprising a mixture of:

1) a hydrophobic peroxyacid of formula $R(O)_nCO_3H$, the parent acid of which, i.e. $R(O)_nCO_2H$, has log P value of between 1.6 and 4.5; and 2) a cationic peroxyacid of formula $R^1,R^2\text{-}R^3-N^+-(R^4)-(O)_n-CO_3H$.

It should be appreciated that such cleaning and bleaching solutions can be prepared not only from compositions comprising a mixture of the specified peroxyacid bleach precursors, but also from compositions comprising a mixture of a hydrophobic peroxyacid bleach precursor and a cationic peroxyacid; a mixture of a hydrophobic peroxyacid and a cationic or amphoteric peroxyacid bleach precursor; or a mixture of the specified peroxyacids themselves, all of which are encompassed within the context of this invention.

In all these instances the same effective molar ratios ranging from 5:1 to 1:5, preferably from 3:1 to 1:3, are applicable.

Preferred compositions are those which comprise a mixture of hydrophobic and cationic or amphoteric peroxyacid bleach precursors, and those compositions comprising a mixture of a hydrophobic peroxyacid and a cationic or amphoteric peroxyacid bleach precursor.

Specific examples of hydrophobic peroxyacids usable herein are n-peroxynonanoic acid, iso-peroxynonanoic acid and preferably phthaloylaminoperoxyhexanoic acid (PAP). The latter is a peroxyacid having the formula:

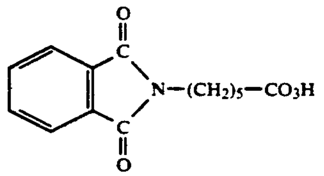

which belongs to the class of compounds described in EP-A-0 325 289.

As explained above, the foregoing bleach activator systems may be incorporated in bleaching and/or detergent compositions which require as an essential ingredient a peroxide bleaching compound capable of yielding hydrogen peroxide in aqueous solution.

Hydrogen peroxide sources are well known in the art. They include the alkali metal peroxides, organic peroxide bleaching compounds such as urea peroxide, and inorganic persalt bleaching compounds, such as the alkali metal perborates, percarbonates, and perphosphates. Mixtures of two or more such compounds may also be suitable. Preferred compounds are sodium percarbonate, sodium perborate tetrahydrate and, especially, sodium perborate monohydrate. Sodium perborate monohydrate is preferred to tetrahydrate because it has excellent storage stability while also dissolving very quickly in aqueous bleaching solutions. Rapid dissolution is believed to permit formation of higher levels of percarboxylic acid which would enhance surface bleaching performance.

Typically, the molar ratio of hydrogen peroxide (or a peroxide compound generating the equivalent amount of $H_2O_2$) to precursor will range from 0.5:1 to about 20:1, preferably 1:1 to 10:1, most preferably from 2:1 to 6:1.

A detergent formulation containing a peroxide compound and the novel bleach activator system of the invention will usually also contain surface-active materials, detergency builders and other known ingredients of such formulations.

In such formulations the total amount of peroxyacid bleach precursors may range from about 0.1% to 20% by weight, preferably from 0.5% to 10% by weight, particularly from 1% to 7.5% by weight, and the peroxide bleaching compound, e.g. sodium perborate mono- or tetra-hydrate, may be present at a level within the range of from about 1% to 40%, preferably from about 2% to 30%, particularly from about 3% to 25% by weight.

The surface-active material may be naturally derived, such as soap, or a synthetic material selected from anionic, nonionic, amphoteric, zwitterionic, cationic actives and mixtures thereof. Many suitable actives are commercially available and are fully described in literature, for example in "Surface Active Agents and Detergents", Volumes I and II, by Schwartz, Perry and Berch. The total level of the surface-active material may range up to 50% by weight, preferably being from about 1% to 40% by weight of the composition, most preferably 4 to 25%.

Synthetic anionic surface-actives are usually water-soluble alkali metal salts of organic sulphates and sulphonates having alkyl radicals containing from about 8 to about 22 carbon atoms, the term alkyl being used to include the alkyl portion of higher aryl radicals.

Examples of suitable synthetic anionic detergent compounds are sodium and ammonium alkyl sulphates, especially those obtained by sulphating higher ($C_8$–$C_{18}$) alcohols produced, for example, from tallow or coconut oil; sodium and ammonium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those esters of the higher alcohols derived from tallow or coconut oil and synthetic alcohols derived from petroleum; sodium coconut oil fatty acid monoglyceride sulphates and sulphonates; sodium and ammonium salts of sulphuric acid esters of higher ($C_9$–$C_{18}$) fatty alcohol alkylene oxide, particularly ethylene oxide, reaction products; the reaction products of fatty acids such as coconut fatty acids esterified with isethionic acid and neutralized with sodium hydroxide; sodium and ammonium salts of fatty acid amides of methyl taurine; alkane monosulphonates such as those derived by reacting alphaolefins ($C_8$–$C_{20}$) with sodium bisulphite and those derived by reacting paraffins with $SO_2$ and $Cl_2$ and then hydrolyzing with a base to produce a random sulphonate; sodium and ammonium $C_7$–$C_{12}$ dialkyl sulfosuccinates; and olefin sulphonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkylbenzene sulphonates, sodium ($C_{16}$–$C_{18}$) alkyl sulphates and sodium ($C_{16}$–$C_{18}$) alkyl ether sulphates. Examples of suitable nonionic surface-active compounds which may be used, preferably together with the anionic surface-active compounds, include in particular the reaction products of alkylene oxides, usually ethylene oxide, with alkyl ($C_6$–$C_{22}$) phenols, generally 5-25 EO, i.e. 5-25 units of ethylene oxides per molecule; the condensation products of aliphatic ($C_8$–$C_{18}$) primary or secondary linear or branched alcohols with ethylene oxide, generally 6-30 EO, and products made by condersation of ethylene oxide with the reaction products of propylene oxide and ethylene diamine. Other so-called nonionic surface-actives include alkyl polyglycosides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

As stated above, soaps may also be incorporated in the compositions of the invention, preferably at a level of less than 25% by weight. They are particularly useful at low levels in binary (soap/anionic) or ternary mixtures together with nonionic or mixed synthetic anionic and nonionic compounds. Soaps which are used are preferably the sodium, or, less desirably, potassium salts of saturated or unsaturated $C_{10}$–$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about lo%, are used to give a beneficial effect on detergency. This is particularly valuable in compositions used in hard water when the soap acts as a supplementary builder.

The detergent compositions of the invention will normally also contain a detergency builder. Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate; nitrilotriacetic acid and its water-soluble salts; the akali metal salts of carboxymethyloxy succinic acid, ethylene diamine tetraacetic acid, oxydisuccinic acid, mellitic acid, benzene polycarboxylic acids, citric acid; and polyacetal carboxylates as disclosed in U.S. Pat. Nos. 4,144,226 and 4,146,495.

Examples of precipitating builder materials include sodium orthophosphate, sodium carbonate, sodium carbonate/calcite, and long chain fatty acid soaps.

Examples of calcium ion-exchange builder materials include the various types of water-insoluble crystalline or amorphous aluminosilicates, of which zeolites are the best known representatives.

These builder materials may be present at a level of, for example, from 5 to 80% by weight, preferably from 10 to 60% by weight.

Apart from the components already mentioned, the detergent compositions of the invention can contain any of the conventional additives in the amounts in which such materials are normally employed in fabric washing detergent compositions. Examples of these additives include lather boosters, such as alkanolamides, particularly the monoethanol amides derived from palmkernel fatty acids and coconut fatty acids, lather depressants, such as alkyl phosphates and silicones, anti-redeposition agents, such as sodium carboxymethyl cellulose and alkyl or substituted alkyl cellulose ethers, other stabilizers, such as ethylene diamine tetraacetic acid, and the phosphonic acid-based chelants (e.g. Dequest ® type), fabric softening agents, inorganic salts, such as sodium sulphate, and, usually present in very small amounts, fluorescent agents, perfumes, enzymes, such as proteases, cellulases, lipases and amylases, germicides and colourants.

The bleach activator system described herein can be introduced in a variety of product forms including powders, on sheets or other substrates, in pouches, in tablets or in non-aqueous liquids, such as liquid nonionic detergents.

Generally, for reasons of stability and handling, the bleach precursors will advantageously be presented in the form of particulate bodies comprising said bleach precursor and a binder or agglomerating agent. Many and diverse methods of preparing such precursor particulates have been described in various patent literature documents, such as e.g. in Canadian Patent No. 1,102,966; GB Patent No. 1,561,333; U.S. Pat. No. 4,087,369; EP-A-0,240,057; EP-A-0,241,962; EP-A-0,101,634 and EP-A-0,062,523. Each of these methods may be selected and applied to the bleach precursor of the invention.

Particulates incorporating the precursors of the present invention are normally added to the spray-dried portion of the detergent composition with the other dry-mix ingredients, such as enzymes, inorganic peroxygen bleaches and suds depressants. It will be appreciated, however, that the detergent composition to which the precursor particulates are added may itself be made in a variety of ways, such as dry-mixing, agglomeration extrusion, flaking etc., such ways being well known to those skilled in the art and not forming part of the present invention.

The bleach activator system of the invention can also be incorporated in detergent additive products. Such additive products are intended to supplement or boost the performance of conventional detergent compositions and may contain any of the components of such compositions, although they will not comprise all of the components present in a fully formulated detergent composition. Additive products in accordance with this aspect of the invention will normally be added to an aqueous liquor containing a source of (alkaline) hydrogen peroxide, although in certain circumstances a source of alkaline hydrogen peroxide may be included in the product.

Additive products in accordance with this aspect of the invention may comprise the compound alone in combination with a carrier, such as a compatible particulate substrate, a flexible non-particulate substrate or a container (e.g. pouch or sachet).

Examples of compatible particulate substrates include inert materials, such as clays and other aluminosilicates including zeolites both natural and synthetic of origin. Other compatible particulate carrier materials include hydratable inorganic salts, such as phosphates, carbonates and sulphates.

Additive products enclosed in bags or containers can be manufactured such that the containers prevent egress of their contents when dry but are adapted to release their contents on immersion in an aqueous solution.

In a further specific embodiment, the bleach activator system of the invention can be suitably incorporated in so-called non-aqueous liquid laundry detergent compositions together with a peroxide bleaching compound, e.g. sodium perborate, to impart an effective cleaning and stain-removing capacity to the products on fabrics and other substrates.

Non-aqueous liquid detergent compositions including paste-like and gelatinous detergent compositions in which the precursor compounds can be incorporated are known from the art and various formulations have been proposed, e.g. in U.S. Pat. Nos. 2,864,770; 2,940,938; 4,772,412; 3,368,977; GB-A-1,205,711; 1,270,040; 1,292,352; 1,370,377; 2,194,536; DE-A-2,233,771; and EP-A-0,028,849.

These are compositions which normally comprise a non-aqueous liquid medium with or without a solid phase dispersed therein. The non-aqueous liquid medium may be a liquid surfactant, preferably a liquid nonionic surfactant; a non-polar liquid medium, e.g.

liquid paraffin; a polar solvent, e.g. polyols, such as glycerol, sorbitol, ethylene glycol, optionally combined with low-molecular monohydric alcohols, e.g. ethanol or isopropanol; or mixtures thereof.

The solid phase can be builders, alkalis, abrasives, polymers, clays, other solid ionic surfactants, bleaches, enzymes, fluorescent agents and other usual solid detergent ingredients.

Essentially the bleaching composition described herein can be used in any cleaning product requiring bleach and/or hygiene properties, such as, for example, laundry detergents, laundry bleaches, household cleaners, toilet bowl cleaners, automatic dishwashing compositions, denture cleaners, etc.

The following Examples will more fully illustrate the embodiments of the invention:

EXAMPLE I

Bleaching tests were carried out on tea-stained test cloths in a Tergotometer under isothermal wash conditions at 40° C. for 30 minutes, using aqueous bleach solutions containing hydrogen peroxide and mixtures of peroxyacid bleach precursors (i) and (ii) at varying molar ratios.

Each bleach solution was set at pH 8 and contained 12 mMol $H_2O_2$ and a total precursor concentration of 1.2 mMol.

In the first series of experiments SPCC was used as precursor (i) and STHOBS was used as precursor (ii).

In the second series of experiments SPCC was used as precursor (i) and SNOBS was used as precursor (ii).

Bleaching performances were determined as $\Delta R_{460}$* for each precursor mixture at molar ratios of 4:0; 3:1; 2:2; 1:3 and 0:4. The results are depicted in the graphs of FIGS. 1 and 2.

EXAMPLE II

Under the same conditions as in Example I, bleaching tests were carried out with SPCC/SNOBS as the precursor mixture on lycopene-stained test cloth.

Figure 1:
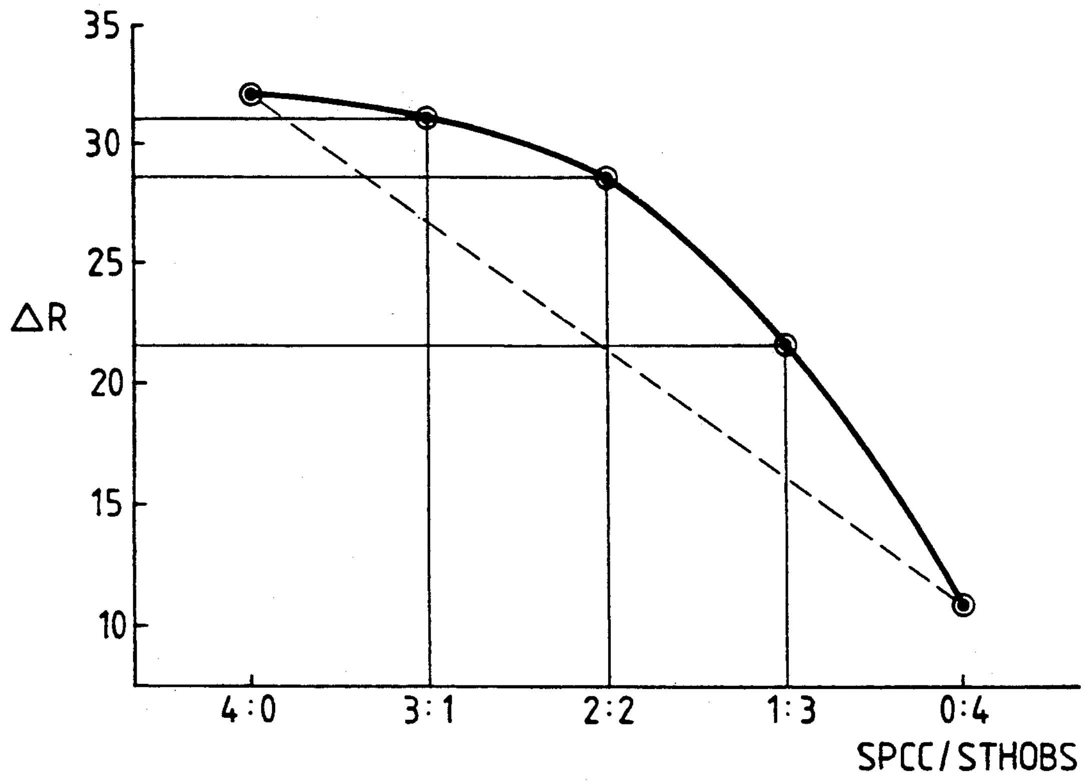
FIG. 1 shows the theoretical (dotted line) and actual ΔR as a function of SPCC/STHOBS ratio.
Figure 2:
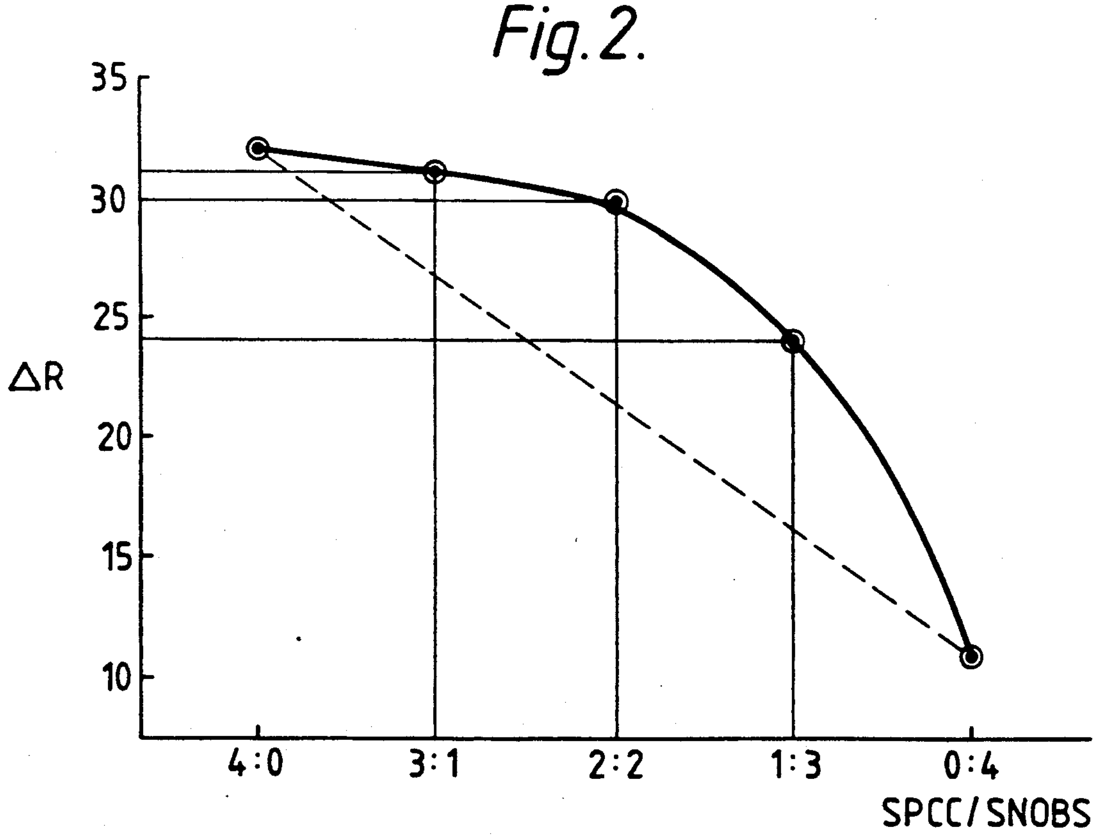
FIG. 2 shows the theoretical (dotted line) and actual ΔR as a function of SPCC/SNOBS ratio.
Figure 3:
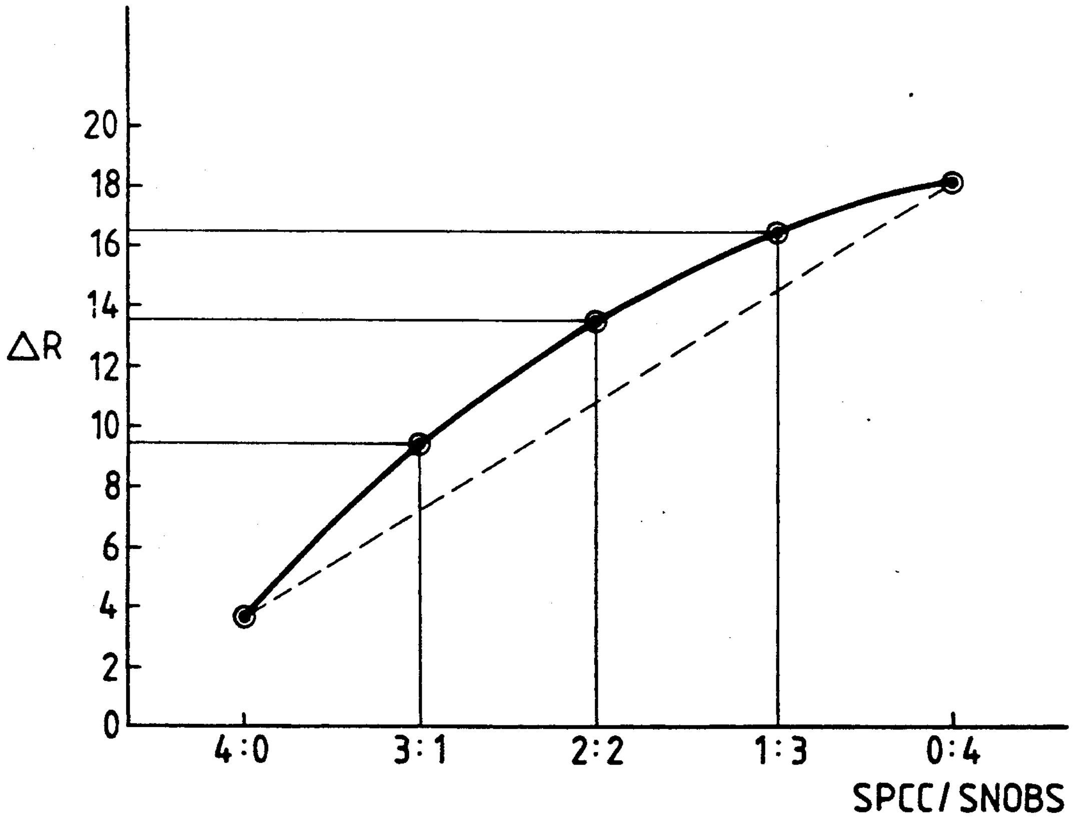

FIG. 3 shows the theoretical (dotted line) and actual ΔR as a function of SPCC/SNOBS ratio on lycopene.

EXAMPLE III

Bleaching tests were carried out on tea-stained test cloths in a Tergotometer under isothermal wash conditions at 40° C. for 30 minutes, using aqueous bleach solutions containing hydrogen peroxide and systems consisting of the hydrophobic peroxyacid PAP and a cationic peroxyacid bleach precursor at various molar ratios.

Each bleach solution contained 12 mMol $H_2O_2$ and a total precursor/peracid concentration of 1.2 mMol.

In the first series of experiments mixtures of PAP and SPCC were used in bleach solutions set at pH 8.

In the second series of experiments mixtures of PAP and trimethylammonium acetonitrile (TAAN) were used in bleach solution set at pH 9.

Bleaching performances were determined as ΔR460* for each PAP/precursor mixture at molar ratios of 0:4; 1:3; 2:2; 3:1 and 4:0.

The results are tabulated below:

TABLE

| Molar ratio | ΔR460* Theoretical | ΔR460* Actual |
|---|---|---|
| PAP/SPCC | | |
| 0:4 | 13 | 13 |
| 1:3 | 17.75 | 20 |
| 2:2 | 22.5 | 25 |
| 3:1 | 27.25 | 28.5 |
| 4:0 | 32 | 32 |
| PAP/TAAN | | |
| 0:4 | 9.1 | 9.1 |
| 1:3 | 13.45 | 16.5 |
| 2:2 | 17.8 | 20.6 |
| 3:1 | 22.15 | 23.8 |
| 4:0 | 26.5 | 26.5 |

All the above Examples demonstrate the phenomena of synergestic bleaching with systems providing in solution a mixture of hydrophobic peroxyacid and cationic peracid.

We claim:

1. A bleaching composition comprising from 0 to 50% by weight of a surface-active material, from 0 to 80% of a detergent builder and a mixture selected from the group consisting of:

(a) a hydrophobic peroxyacid bleach precursor and a cationic or amphoteric peroxyacid bleach precursor;

(b) a hydrophobic peroxyacid bleach precursor and a cationic peroxyacid;

(c) a hydrophobic peroxyacid and a cationic or amphoteric peroxyacid bleach precursor; and (d) a hydrophobic peroxyacid and a cationic peroxyacid, which upon dissolution in an aqueous medium provides a mixture of:

(i) a hydrophobic peroxyacid having the formula:

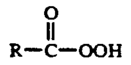

where R is a straight or branched chain, optionally substituted alkyl or alkylene group containing from 6 to 20 carbon atoms, a substituted or unsubstituted aromatic, cyclic alkyl or heterocyclic group containing a total of from 10 to 22 carbon atoms; and (ii) a cationic peroxyacid having the formula:

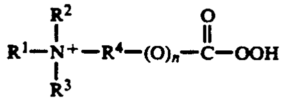

wherein $R^1$, $R^2$ and $R^3$ are each a radical selected from the group consisting of optionally substituted alkyl, alkenyl, alkynyl, cycloalkyl, cycloalkenyl, alkaryl, aryl, phenyl, hydroxyalkyl and polyoxyalkylene, containing 1 to a total of 24 carbon atoms; $R^4$ is a bridging group selected from the group consisting of alkylene, cycloalkylene, alkylene phenylene, arylene, and polyalkoxylene containing from 1 to 20 carbon atoms, which can be substituted with $C_1$-$C_{20}$ alkyl, alkenyl, benzyl, phenyl or aryl radicals; and n is an integer from 0 to 1.

2. A bleaching composition according to claim 1, wherein said hydrophobic peroxyacid bleach precursor is selected from the group of the sodium and potassium salts of p-linear octanoyloxybenzene sulphonate; p-linear nonanoyloxybenzene sulphonate; 3,5,5-trimethyl hexanoyloxybenzene sulphonate; 4-nonanoyloxy benzoate; 1-methoxy-2-decanoyloxy benzene sulphonate and 1-methyl-2-nonanoyloxy benzene sulphonate.

3. A bleaching composition according to claim 1, wherein said cationic or amphoteric peroxyacid bleach precursor is 2-(N,N,N-trimethyl ammonium) ethyl sodium-4-sulphophenyl carbonate chloride.

4. A bleaching composition according to claim 1, wherein said hydrophobic peroxyacid is phthaloylaminoperoxyhexanoic acid.

5. A bleaching composition according to claim 1, wherein said molar ratio ranges from 3:1 to 1:3.

* * * * *